UNITED STATES PATENT OFFICE.

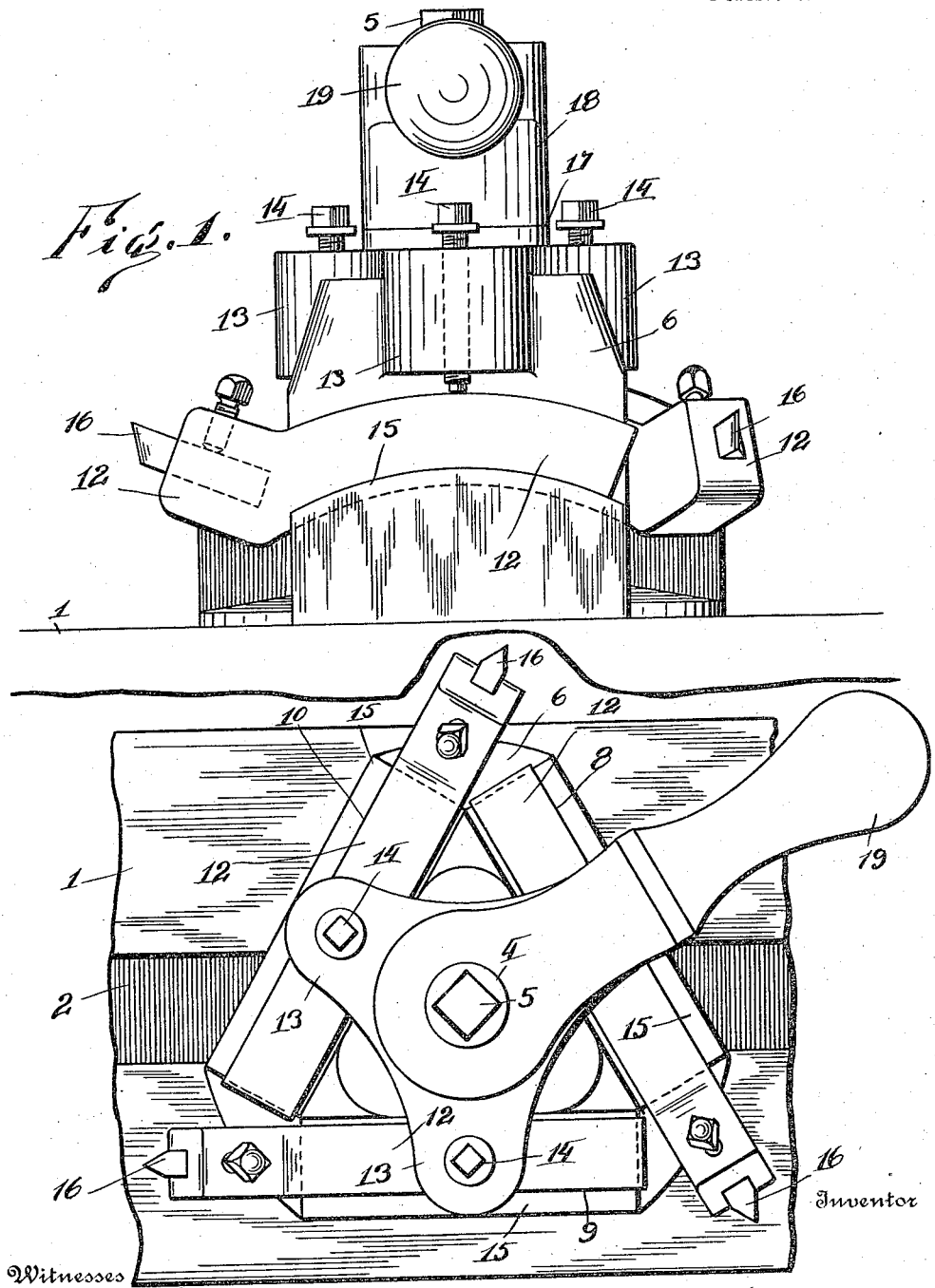

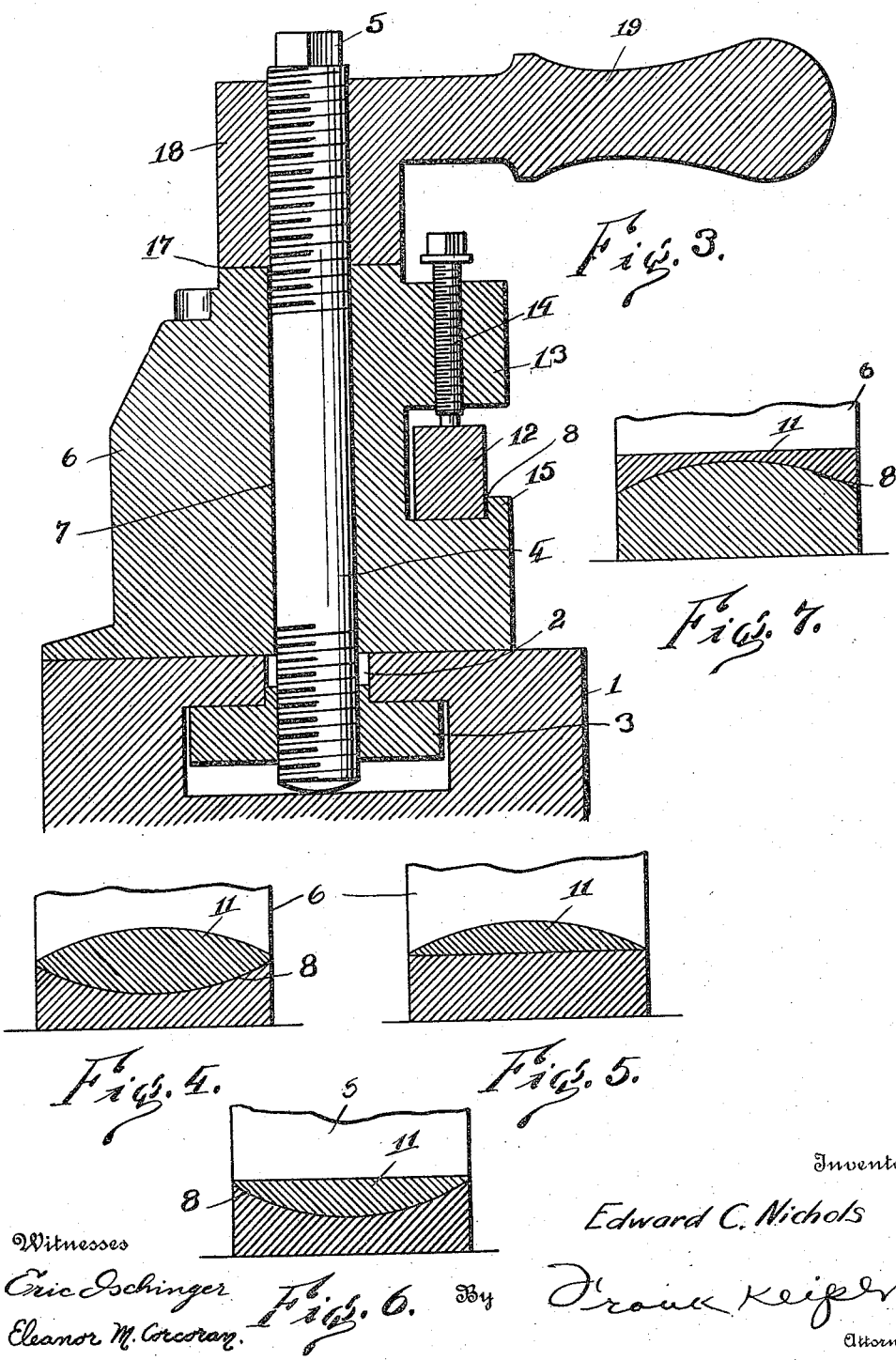

EDWARD C. NICHOLS, OF GENEVA, NEW YORK.

TURRET TOOL-POST.

1,192,930.      Specification of Letters Patent.      Patented Aug. 1, 1916.

Application filed March 10, 1915. Serial No. 13,728.

*To all whom it may concern:*

Be it known that I, EDWARD C. NICHOLS, a citizen of the United States, residing at Geneva, in the county of Ontario and State of New York, have invented certain new and useful Improvements in Turret Tool-Posts, of which the following is a specification.

The object of this invention is to provide a new and useful turret tool post which can be used in connection with a metal working lathe, by which turret the tools used for cutting the stock can be changed rapidly from one to another. This and other objects of the invention will be fully illustrated in the drawings, described in the specification and pointed out in the claims at the end thereof.

In the accompanying drawings, Figure 1 is a side elevation of the turret post. Fig. 2 is a top plan view of the turret post. Fig. 3 is a vertical section through the post taken on the line $3^x$—$3^x$ of Fig. 1. Figs. 4, 5, 6 and 7 are vertical sectional views through one of the grooves into which the tools are clamped showing modified forms thereof.

In the several figures like reference numerals indicate like parts.

The turret tool post is clamped to the guide 1 which constitutes part of a compound rest of the carriage of a lathe. This guide has a slot 2 therein into which is inserted the rectangular nut 3 together with the stud or pin 4 with which it has a threaded engagement. The nut 3 and stud 4 are brought into a suitable position when the stud 4 is screwed into the nut and down against the bottom of the slot. This clamps the nut 3 rigidly in place in the slot and holds the stud 4 firmly in a perpendicular position therein. For this purpose the top of the stud is provided with a square head 5 which can be turned with a suitable wrench.

Pivotally mounted on the stud 4 and resting on the guide 1 is the tool support 6 having a central opening 7 therein with which engages the stud 4. The tool support has three segmental grooves 8, 9 and 10 therein, the bottom of each of which is curved as shown in dotted lines in Figs. 1 and 7. In each of these slots rests a shank 12 of a cutting tool. As shown in Fig. 1 the bottoms of the grooves 8, 9 and 10 are convex while the shanks of the tools have corresponding concave forms to allow them to slide in these grooves. Above each of these tools is placed an overhanging lug 13 through which passes a set screw 14, the bottom of which impinges against the shank 12 and clamps it in place in the corresponding groove. The position of the shank of the tool forward or back determines the angle and height of the tool with respect to the work on which the tool is to operate. The bottom of the grooves 8, 9 and 10 are made convex to prevent the slipping of the tool when pressure is applied to the edge of the cutter. As will be seen in Fig. 1 any pressure applied to the point of the cutter will be substantially radial to the curvature of the segmental grooves so that when the tool operates on the material it will tend to clamp the tool into the grooves instead of forcing it out thereof as would be the case if a straight or concave groove were used. In a straight or concave groove the pressure applied to the tool is parallel or tangential thereto and tends to force the shank of the tool out of the groove.

While I prefer to provide the tool holder with the convex form of grooves, it may also be provided with concave or straight grooves as shown in Figs. 4 and 6, in which case suitable rockers 11 are used. In Fig. 4 the rocker 11 is used to change the concave groove into a convex groove so that the round form of tool shank can be used therein. When a tool with a straight shank must be used, the rocker 11, shown in Fig. 6, is used to change the concave groove into a straight groove, while if the groove is convex the rocker shown in Fig. 7 is used to provide the groove with a flat seat. In Fig. 5 the groove is straight, but it can be changed to the convex form by using the rocker 11 shown in this figure.

It will be seen in Fig. 3 that the grooves are provided with the flange 15 which extends the full length thereof and serves to hold the shank 12 from getting out of place and takes up any side thrust to which the shank may be subjected. The shanks 12 are either made specially to fit the grooves or they may be of the customary pattern, in which case suitable rockers are used in connection therewith. These shanks carry on their ends a cutting tool 16 which operates on the material.

The top of the turret is finished with the plain surface 17 on which rests the boss 18 which is integral with the handle 19. The boss 18 has a threaded engagement with the top of the stud 4 and may be turned thereon by means of the handle 19.

When the turret 6 has been placed in suitable position by means of the nut 3 and stud 4 with one of the cutting points positioned for engagement with the work, the handle 19 is rotated so as to pinch the boss 18 against the turret, clamping the turret between the boss and the guide 1. The guide 1 and the turret will then move laterally toward the stock and along the stock. After the work of the cutting tool is finished the guide 1 is withdrawn and the handle 19 is moved in the reverse direction, releasing the turret 6 which can then be given a third of a revolution bringing the next tool into position for engagement with the work, after which the turret will again be clamped in position by the handle 19. In this manner the different cutting tools can successively be brought into engagement with the stock that is to be operated on so that no time is lost in changing the cutting tools.

The stud 4 is immovable after being once clamped in place and does not revolve with the turret, but forms a pivot for the turret attachment to revolve on. This feature of the tool post is quite essential to the successful operation of the turret post because any disturbance of the stud 4, when the turret is rotated, would necessitate a new adjustment thereof.

As will be seen in Fig. 3 the tool support comprises a single casting and affords therefore a strong and stable support for the tools.

I claim:

1. The combination of a guide having a slot of inverted T-shape in cross section, a support mounted on said guide, a stud mounted in the support having one end entering said slot and bearing on the bottom thereof, and a nut within said slot threaded on said stud and having an outer face to bear outwardly against an overhanging wall of the slot and adapted to firmly hold the stud and support at any adjusted position along the length of said slot.

2. The combination of a guide having a slot of inverted T-shape in cross section, a support mounted on said guide, a stud mounted in the support having one end entering said slot and bearing on the bottom thereof, and a nut within said slot threaded on said stud and having an outer face to bear outwardly against an overhanging wall of the slot and adapted to firmly hold the stud and support at any adjusted position along the length of said slot, said stud having a many-sided end adapted for engagement of a tool.

3. The combination of a carriage having a stud mounted thereon, means to fasten said stud in a plurality of positions on said carriage, said stud serving as a post, and a tool holder mounted on said carriage to rotate around said post.

4. The combination of a carriage having a slot therein, a stud mounted in said slot, means for fastening said stud at any point along said slot, said stud serving as a post, and a tool holder mounted on said carriage to rotate around said post.

5. The combination of a carriage having a slot therein, a stud mounted in said slot, means for fastening said stud at any point along said slot, a clamping device threaded on said post, said clamping device being capable of clamping an object between itself and the carriage.

6. The combination of a carriage having a T-slot therein, a nut in said slot, a stud making thread engagement with said nut, said stud bearing against the closed side of said slot and holding the nut against the open side of said slot, said stud serving as a post, and a tool holder mounted on said carriage to rotate around said post.

7. The combination of a carriage having a T-slot therein, a nut in said slot, a stud making threaded engagement with said nut, said stud bearing against the closed side of said slot and holding the nut against the open side of said slot, said stud serving as a post, a tool holder mounted on said carriage to rotate around said post, and a handle having threaded engagement with the top of said stud adapted to clamp said tool holder to said carriage.

8. In a lathe the combination of a carriage having a post thereon and a tool holder adapted to rotate on said post, said tool holder having a groove at the side thereof with a convex bottom, a lug overhanging said groove, a tool in said groove, said tool having its under surface substantially conforming to the curvature of the bottom of said groove, and being mounted to slide thereon, and a set screw in said lug adapted to clamp the tool in said groove at any desired angle.

In testimony whereof I affix my signature in presence of two witnesses.

EDWARD C. NICHOLS.

Witnesses:
JOHN S. COLLINS,
LEONARD W. BALDWIN.